United States Patent [19]
Weymouth, Jr.

[11] Patent Number: 5,441,398
[45] Date of Patent: Aug. 15, 1995

[54] INSERT FOR MOLDING CONVEX SURFACES OF PROGRESSIVE LENSES AND RETAINER THEREFOR

[75] Inventor: Russell F. Weymouth, Jr., Charlton Depot, Mass.

[73] Assignee: Gentex Optics, Inc., Carbondale, Pa.

[21] Appl. No.: 232,328

[22] Filed: Apr. 25, 1994

Related U.S. Application Data

[63] Continuation of Ser. No. 958,508, Oct. 8, 1992, abandoned.

[51] Int. Cl.⁶ .................. B29C 33/30; B29D 11/00
[52] U.S. Cl. .................. 425/183; 425/186; 425/192 R; 425/195; 425/808; 249/102
[58] Field of Search ............ 425/808, 810, 194, 183, 425/186, 190, 195, 193; 264/177.12; 249/102, 205

[56] References Cited

U.S. PATENT DOCUMENTS

| | | | |
|---|---|---|---|
| 3,902,693 | 9/1975 | Crandon et al. | 425/808 |
| 3,946,982 | 3/1976 | Calkins et al. | 249/102 |
| 4,383,672 | 5/1983 | Kreuttner | 425/808 |
| 4,384,841 | 5/1983 | Yamamoto et al. | 264/177.12 |
| 4,778,632 | 10/1988 | Bakalar | 425/808 |
| 4,790,738 | 12/1988 | Shimojo et al. | 425/192.2 |
| 4,795,127 | 1/1989 | Asai | 425/810 |
| 4,879,082 | 11/1989 | Kudo et al. | 425/810 |
| 5,171,585 | 12/1992 | Onisawa et al. | 425/192 R |
| 5,173,100 | 12/1992 | Shigyo et al. | 425/808 |
| 5,180,595 | 1/1993 | Kinoshita | 425/810 |
| 5,188,650 | 2/1993 | Nomura | 425/808 |

FOREIGN PATENT DOCUMENTS

| | | | |
|---|---|---|---|
| 2519708 | 11/1975 | Germany | 425/808 |
| 60-38116 | 2/1985 | Japan | 425/808 |
| 60-42020 | 3/1985 | Japan | 425/808 |

*Primary Examiner*—Khanh P. Nguyen
*Attorney, Agent, or Firm*—Shenier & O'Connor

[57] ABSTRACT

An insert for molding the convex surface of a progressive lens, the insert having an annular shoulder or flat disposed to the rear of the front edge of the concave surface of the insert. The periphery of the insert includes a first cylindrical surface axially extending rearwardly from the front surface of the insert and a second cylindrical surface of larger diameter axially extending forwardly from the rear surface of the insert. The two cylindrical surfaces are joined by the radially extending shoulder. A retainer for the insert is provided with two axially displaced bores of respective diameters slightly greater than those of the two cylindrical surfaces of the insert. Positioned between the bores is a radially extending annular shoulder or flat.

4 Claims, 2 Drawing Sheets

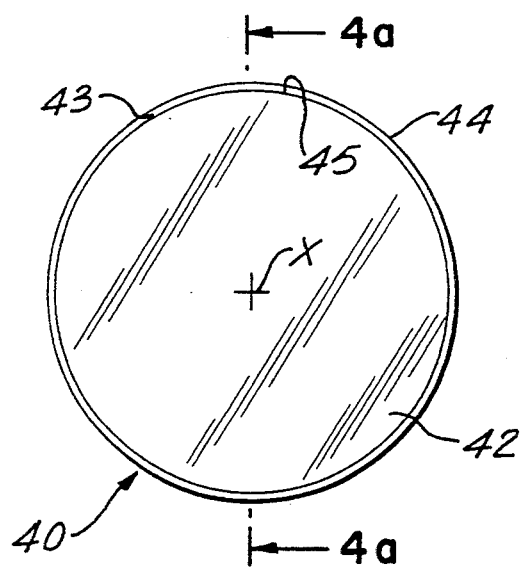
FIG. 4
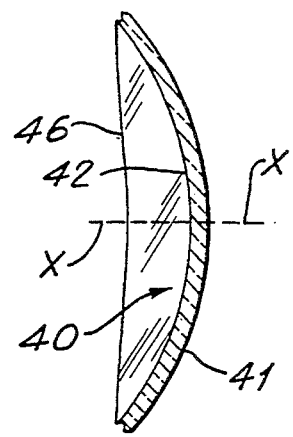
FIG. 4a
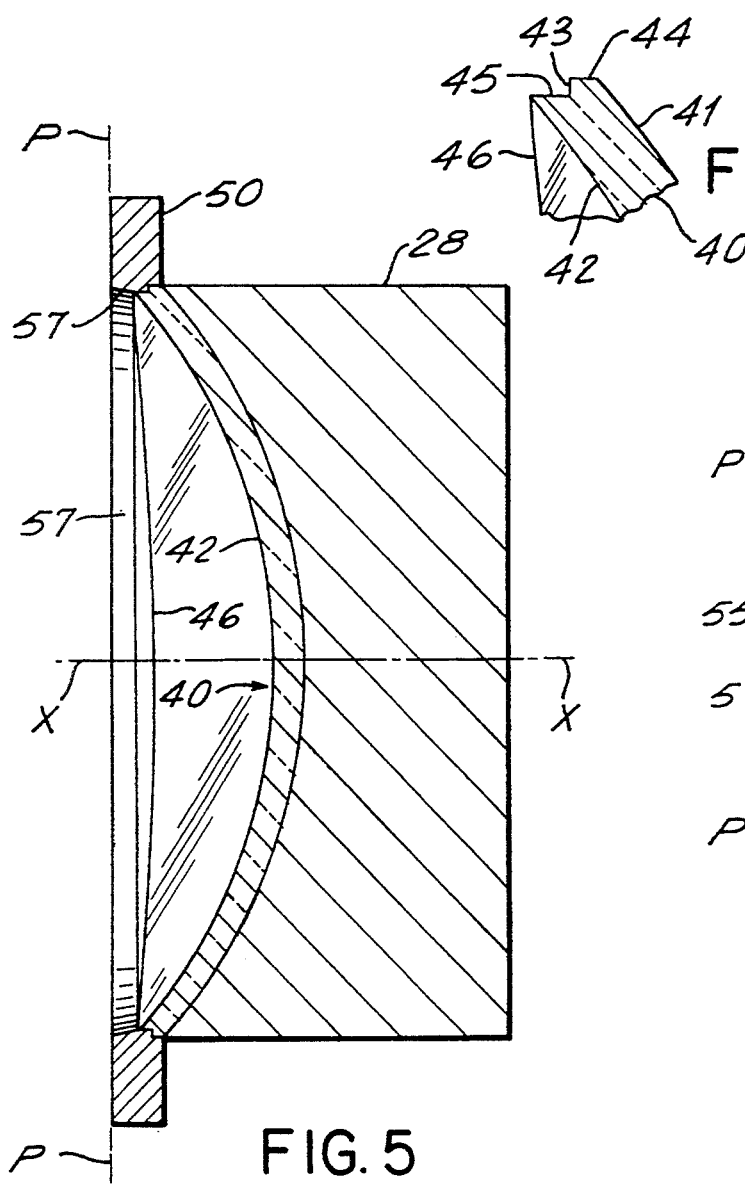
FIG. 4b
FIG. 5
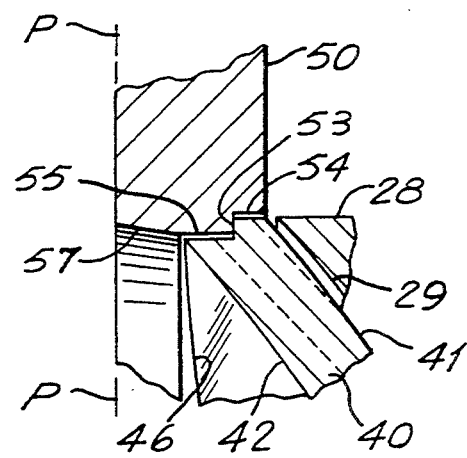
FIG. 5a ial.com
INSERT FOR MOLDING CONVEX SURFACES OF PROGRESSIVE LENSES AND RETAINER THEREFOR This is a continuation of application Ser. No. 07/958,508 filed on Oct. 8, 1992 now abandoned.

SUMMARY OF THE INVENTION

My invention relates to an insert for molding the convex surface of a progressive lens wherein the insert, instead of being provided with a flat on the front surface thereof, is instead provided with an annular flat or shoulder intermediate the front and rear surfaces and extending between a first cylindrical surface of predetermined diameter extending rearwardly from the front surface and a second cylindrical surface of larger diameter extending forwardly from the rear surface. The insert is held by a retainer having two axially displaced cylindrical bores of different diameters and an intermediate shoulder, each of which cooperates with a corresponding element of the insert. If the front surface of a progressive insert were provided with a flat, then the inner contour of the flat would not be a circle concentric with the circular outer contour. Since the retainer has a cylindrical bore for forming the periphery of the lens, the molded lens would then have a flat on its front or convex surface. A larger lens must then be provided so that the periphery can be ground away until the flat is removed. This will become more clear by subsequent reference to FIGS. 1, 2 and 3.

One object of my invention is to provide an insert for molding the convex surface of a progressive lens which obviates the formation of any flat on the molded lens, Another object of my invention is to provide an insert for molding convex surfaces of progressive lenses wherein the insert is provided with a flat in the nature of a shoulder intermediate the front and rear surfaces of the insert, A further object of my invention is to provide a retainer for such insert wherein the retainer is provided with two axially displaced cylindrical bores of different diameters with a radial shoulder disposed therebetween, Other and further objects of my invention will appear from the following description.

BRIEF DESCRIPTION OF THE DRAWINGS

In the accompanying drawings in which like reference characters are used to indicate like parts in the various views:

FIG, 1 is an axial view of an insert for molding a lens having a spherical convex surface, FIG, 1a is a sectional view of the insert of FIG, 1, FIG, 2 is a fragmentary sectional view on an enlarged scale of the insert of FIG, 1 positioned in a retainer, FIG. 3 is an axial view of a typical progressive insert provided with a flat on the front surface in the manner shown in FIGS. 1 and 1a.

FIG. 4 is an axial view of my improved progressive insert.

FIG. 4a is a sectional view of the insert of FIG. 4.

FIG. 4b is a fragmentary view on an enlarged scale of the view of FIG. 4a.

FIG. 5 is a sectional view on an enlarged scale showing the insert of FIG. 4 positioned in a retainer.

FIG. 5a is a fragmentary view on a greatly enlarged scale of the view of FIG. 5.

THE PRIOR ART

Figure 1:
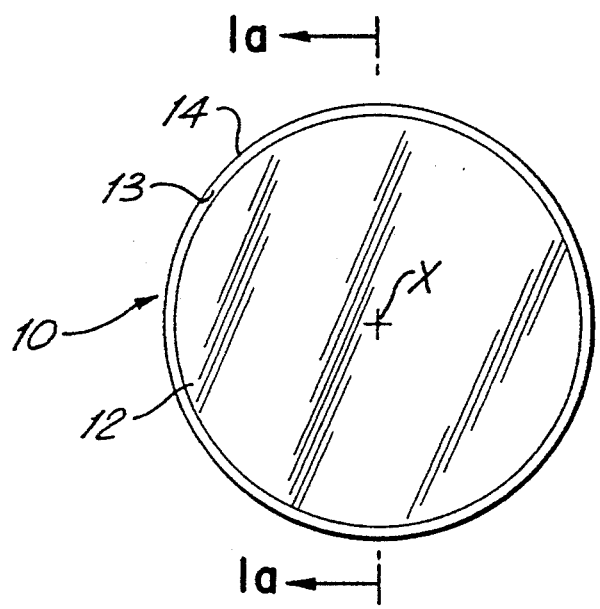
Figure 1A:
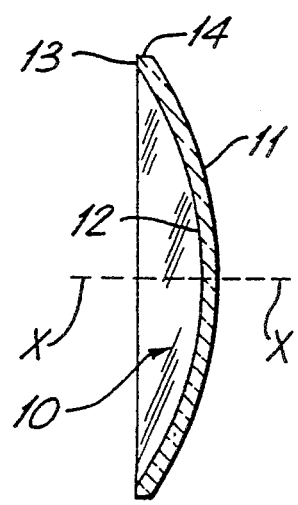

Referring now to FIGS. 1 and 1a of the drawings, insert 10 is provided with a concave spherical surface 12 which molds the convex spherical surface of a spherical lens. The axis X passes through the center of insert 10. Rear surface 11 of insert 10 is generally spherical. The front surface 12 of insert 10 is provided with a flat 13 and with a cylindrical periphery 14. As seen in FIG. 1, the flat 13 is of uniform radial thickness, typically 2 millimeters.

Figure 2:
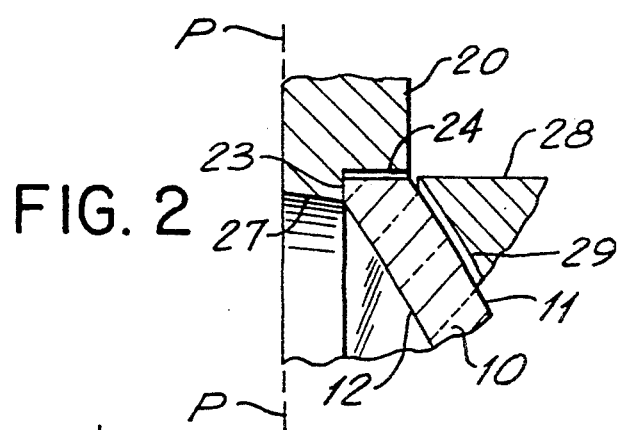

Referring now to FIG. 2, a retainer 20 is provided with a tapered bore 27 extending from the front surface at which the bore has its largest diameter. This front surface may be the mold parting line P. Bore 27 defines the periphery of the molded lens; and the taper permits ready removal of the lens from the mold. Tapered bore 27 terminates in a diameter equal to the inner diameter of flat 13. Retainer 20 is provided with a radially extending planar flat 23 which abuts the corresponding flat 13 of insert 10. Retainer 20 is also provided with a cylindrical bore 24 axially extending forwardly from the rear surface of the retainer to the shoulder 23. Typically the radius of the periphery 14 of insert 10 is approximately 1 mil less than that of bore 24 to provide a corresponding clearance. A backing insert 28, shown in greater detail in FIGS. 5 and 5a is provided with a generally spherical front surface 29 which matches the rear surface 11 of insert 10. Typically there is an axial clearance of approximately 1 mil between surface 11 of insert 10 and surface 29 of backing insert 28.

Typically, the insert is formed of glass whereas the retainer and backing insert 28 are formed of steel. These materials have different coefficients of thermal expansion. Some slight clearance is necessary, not only to assemble the parts but also to prevent shattering of the insert when the mold is heated and cooled. The lens material may be a plastic such as polycarbonate.

Figure 3:
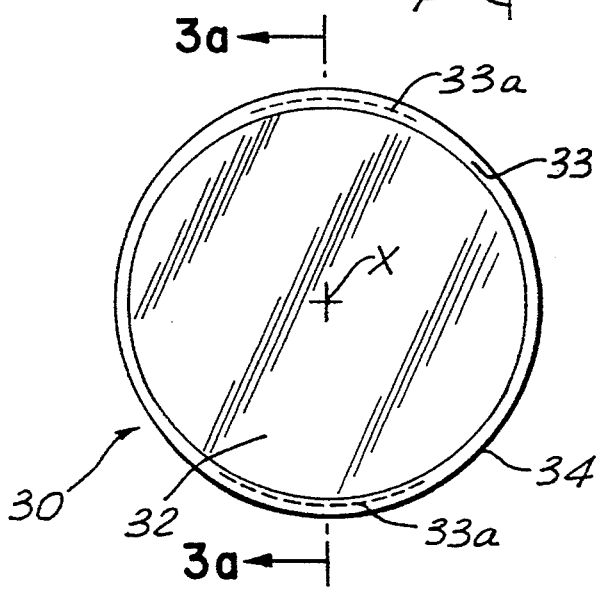
Figure 3A:
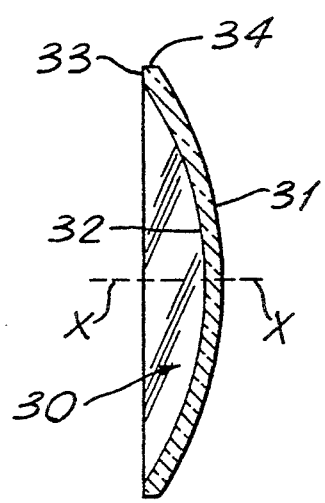
FIG. 3a is a sectional view of the insert of FIG. 3.

Referring now to FIG. 3, insert 30 has a front surface 32 which forms the convex surface of a progressive lens. The rear surface 31 of insert 30 is generally spherical; and axis X passes through the center of insert 30. If the front surface 32 were provided with a flat 33 in the same manner as FIG. 1, it will be seen that the inner contour of flat 33 is not a circle concentric with the circular outer contour 34; and the flat does not have a uniform radial extent.

The upper and lower portions of flat 33 in FIG. 3 are of large radial extent; and the left and right portions are of a much smaller radial extent. The inner contour of flat 33 will not in general be of the centered elliptical shape shown. If a retainer 20 were provided wherein the tapered bore 27 were to match the extent of flat 33 at the left and right portions, then an appreciable portion of flat 33 would still appear adjacent the upper and lower portions thereof. It will be apparent that the diameter of the tapered bore 27 cannot be reduced so as to match the upper and lower portions of flat 33, since the molded lens could not then be removed from the mold. The broken lines 33a of FIG. 3 represent the minimum diameter of the tapered bore 27 which is tangent to the inner contour of flat 33 at the left and right portions thereof. The entire area of flat 33 lying within the circle 33a represents a flat surface which will be produced on the convex surface of the molded lens. The lens must thus be appreciably larger than the desired final diameter, since the flat portion of the progressive lens must be removed as by turning or machining the lens to an appreciably smaller diameter.

DESCRIPTION OF THE PREFERRED EMBODIMENT

Referring now to FIGS. 4, 4a and 4b, insert 40 has a progressive concave surface 42 and a generally spherical convex surface 41. Axis X passes through the center of insert 40. Insert 40 is provided with a cylindrical periphery 44 adjacent surface 41. Insert 40 is provided with a cylindrical periphery 45 of slightly smaller diameter adjacent surface 42. Between cylindrical surfaces 45 and 44 is provided a shoulder 43, typically of 2 millimeters radial extent, lying in a plane orthogonal to the axis X of insert 40. Axis X is a mechanical axis which corresponds to the axis of the generally spherical surface 41.

From FIG. 4a it will be noted that peripheral edge 46 of insert 40 does not lie in a plane orthogonal to the X axis. Instead the axial length of cylindrical surface 45 varies about the circumference of insert 40 as determined by the shape of the progressive surface 42. The axial length of the cylindrical surface 44 is generally constant about the periphery since the surface 41 is generally spherical.

Referring now to FIGS. 5 and 5a, retainer 50 is provided with a tapered bore 57 which merges with a rearwardly extending cylindrical bore 55. The tapered bore 57 has its largest diameter at the front surface of retainer 50 which may be the mold parting line P. The diameter of bore 55 is approximately 2 mils greater than the diameter of cylindrical surface 45 of insert 40. Retainer 50 is provided with a further cylindrical bore 54 which is approximately 2 mils larger than the diameter of cylindrical surface 44 of insert 40 and extends forwardly from the rear surface of retainer 50. Between bores 54 and 55 there is disposed a flat shoulder 53 of approximately 2 millimeters radial extent in a plane normal to the axis X which cooperates with the shoulder 43 of insert 40. Backing insert or backing die 28 has a generally spherical surface 29 matching surface 41 of insert 40. There may be approximately a 1 mil axial clearance between surface 29 of backing insert 28 and surface 41 of insert 40. It will be noted that the periphery of the molded lens will be defined not only by the tapered bore 57 but also by variable portions of the uniform cylindrical bore 55, since the peripheral edge 46 of insert 40 does not lie in a plane orthogonal to the X axis. Because the cylindrical portions of the periphery of the molded lens are of relatively short axial extent, the molded lens can be removed from the mold without undue difficulty.

It will be seen that I have accomplished the objects of my invention. The provision of a shoulder appreciably displaced from the progressive front surface of the insert permits the periphery of the insert at the front surface to have a variable axial extent. There is no flat surface of variable radial extent created on the front surface of the insert. The insert may have the proper diameter; and the progressive lens formed by the insert need not be made oversize and subsequently turned or machined to a proper size to eliminate such flat front surface. My retainer is complementary to and cooperates with the insert and comprises two axially displaced cylindrical bores of different diameters with a radial shoulder disposed therebetween.

Having thus described my invention, what I claim is:

1. Apparatus for molding the convex surface of a progressive lens including in combination an insert having a progressive concave front surface, a generally spherical convex rear surface, a mechanical axis, and a periphery; said periphery comprising a first cylindrical surface of a first diameter axially extending rearwardly from the front surface, a second cylindrical surface of a second and larger diameter axially extending forwardly from the rear surface, and a shoulder disposed in a plane orthogonal to the insert axis and connecting the first and second cylindrical surfaces; and a retainer having a mechanical axis and respective front and rear surfaces disposed in respective planes extending orthogonally to the retainer axis; the retainer comprising a first cylindrical bore of a diameter slightly larger than the first diameter and axially extending rearwardly from its front surface, a second cylindrical bore of a diameter slightly larger than the second diameter and axially extending forwardly from its rear surface, and a shoulder disposed in a plane orthogonal to the retainer axis and connecting the first and second cylindrical bores; the insert and the retainer being mated with common axes and with respective shoulders generally abutting one another.

2. Apparatus as in claim 1 wherein the first cylindrical bore comprises a tapered portion axially extending rearwardly from the retainer front surface and having its largest diameter at the retainer front surface.

3. Apparatus as in claim 1 wherein the insert is formed of glass.

4. Apparatus as in claim 1 further including a backing die having a generally spherical concave front surface which matches the convex rear surface of the insert, a generally flat rear surface, a mechanical axis, and a cylindrical periphery; the insert and the backing die being mated with common axes and with respective rear and front surfaces generally abutting one another.

* * * * *